(12) United States Patent
Dürre et al.

(10) Patent No.: US 10,941,808 B2
(45) Date of Patent: Mar. 9, 2021

(54) SHAFT BEARING

(71) Applicant: VIBRACOUSTIC GMBH, Darmstadt (DE)

(72) Inventors: Markus Dürre, Neuenburg am Rhein (DE); Christian Paul, Auggen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/624,511

(22) PCT Filed: Jun. 7, 2018

(86) PCT No.: PCT/EP2018/064965
§ 371 (c)(1),
(2) Date: Dec. 19, 2019

(87) PCT Pub. No.: WO2018/234047
PCT Pub. Date: Dec. 27, 2018

(65) Prior Publication Data
US 2020/0217362 A1 Jul. 9, 2020

(30) Foreign Application Priority Data
Jun. 23, 2017 (DE) .................... 10 2017 113 999.0

(51) Int. Cl.
*F16C 27/06* (2006.01)
*F16C 35/07* (2006.01)
(Continued)

(52) U.S. Cl.
CPC .......... *F16C 27/066* (2013.01); *F16C 35/077* (2013.01); *B60K 17/24* (2013.01);
(Continued)

(58) Field of Classification Search
CPC ...... F16C 27/06; F16C 27/063; F16C 27/066; F16C 35/077; F16C 2326/05;
(Continued)

(56) References Cited

U.S. PATENT DOCUMENTS 3,639,015 A * 2/1972 Maas ................... F16C 27/066
384/536
4,722,618 A * 2/1988 Matsumoto ........... F16C 27/066
384/535
(Continued)

FOREIGN PATENT DOCUMENTS

| CN | 102996634 A | 3/2013 |
|---|---|---|
| DE | 3729275 A1 | 3/1989 |

(Continued)

OTHER PUBLICATIONS

Grunow, Ingo; Lefévre, Jean: Parameter Determination of a Hyperelastic Material Law for an Elastomeric Rolling Bellows. In: 14th Weimar Optimization and Stochastic Days, 2017, 1 to 7.
(Continued)

*Primary Examiner* — Alan B Waits
(74) *Attorney, Agent, or Firm* — Fishman Stewart PLLC

(57) ABSTRACT

A shaft bearing for supporting a shaft of a motor vehicle includes an inner sleeve, an outer body surrounding the inner sleeve while forming a gap, and an elastomer body elastically connecting the inner sleeve and the outer body. The inner sleeve may have a first rolling surface facing towards the elastomer body and against which a first rolling section of the elastomer body abuts. The outer body may have a second rolling surface facing towards the elastomer body and against which a second rolling section of the elastomer body abuts. The two rolling sections may be connected to each other via a fold having a free length. During movement of the inner sleeve relative to the elastomer body and/or the outer body relative to the inner sleeve, the rolling sections
(Continued)

may roll the same distance on the rolling surfaces, so that the free length of the fold remains unchanged.

10 Claims, 4 Drawing Sheets

(51) Int. Cl.
*B60K 17/24* (2006.01)
*F16F 1/38* (2006.01)
*F16C 35/077* (2006.01)
*F16F 1/387* (2006.01)

(52) U.S. Cl.
CPC .......... *F16C 2326/06* (2013.01); *F16F 1/387* (2013.01); *F16F 1/3835* (2013.01)

(58) Field of Classification Search
CPC . F16C 2326/06; F16C 2326/30; F16F 1/3835; F16F 1/387; B60K 17/24
See application file for complete search history.

(56) References Cited

U.S. PATENT DOCUMENTS

| | | | | |
|---|---|---|---|---|
| 5,145,025 | A * | 9/1992 | Damian | F16F 15/02 180/381 |
| 6,948,857 | B2 * | 9/2005 | Schuetz | F16C 23/084 384/498 |
| 9,328,772 | B2 | 5/2016 | Ikeda | |
| 2003/0219183 | A1 * | 11/2003 | Schuetz | F16C 27/066 384/495 |
| 2011/0133413 | A1 * | 6/2011 | Kato | F16J 15/3232 277/565 |
| 2014/0374972 | A1 | 12/2014 | Kroger | |
| 2018/0334030 | A1 * | 11/2018 | Seipel | F16C 27/066 |
| 2019/0264736 | A1 * | 8/2019 | Durre | F16C 27/066 |

FOREIGN PATENT DOCUMENTS

| | | |
|---|---|---|
| DE | 4320642 C1 | 1/1995 |
| DE | 102012220317 A1 | 5/2013 |
| DE | 102014107477 A1 * | 12/2015 |
| EP | 0577918 A2 | 1/1994 |
| JP | S5617417 U | 2/1981 |
| JP | H10-230752 A | 9/1998 |
| JP | 2000192954 A | 7/2000 |
| JP | 3933236 B2 | 6/2007 |

OTHER PUBLICATIONS

International Search Report PCT/EP2018/064965, filed Dec. 27, 2018.
English Translation of JP Application, JP S5617417U, of which was formally submitted on Dec. 18, 2019.
English Translation of JP Application, JP H10230752A, see foreign reference filed herewith.
German Office Action, DE 10 2017 113 999.0, dated Sep. 15, 2020.
Translation of Chinese Office Action, 201880041087.3, dated Oct. 10, 2020.
Chinese Office Action, 201880041087.3, dated Oct. 10, 2020.
Chinese Search Report, 2018800410873, dated Sep. 28, 2020.

* cited by examiner ical Field

The invention relates to a shaft bearing for supporting a shaft, particularly a drive shaft of a motor vehicle, comprising an inner sleeve, an outer body surrounding the inner sleeve while forming a gap, and an elastomer body, which elastically connects the inner sleeve and the outer body.

BACKGROUND

A shaft bearing of the type mentioned in the introduction is used for supporting a shaft, particularly a drive shaft, such as a cardan shaft, for example, of a motor vehicle, in order to dampen and/or isolate the vibrations occurring on the shaft during driving. The shaft bearing also serves for keeping the shaft in position during driving and for absorbing axial displacements while starting and braking, and also for damping and/or isolating noise, resonance frequencies and wobbling movements of the shaft.

For this purpose, the shaft bearing is coupled to the shaft via the inner sleeve, so that vibrations of the drive shaft are introduced into the shaft bearing. Thus, the elastomer body begins to be deformed and dampens and/or isolates the vibrations introduced into the shaft bearing. The shaft bearing is fixed via the outer body to a motor vehicle component, such as a motor vehicle body or a motor vehicle floor, for example.

In order to optimally dampen and/or isolate the vibrations of the shaft, the latter is frequently divided into at least two segments, because the bending eigenmode of a single-part shaft is too close to a possible rotational speed. The segments are held in position by at least one shaft bearing and simultaneously decoupled from the motor vehicle body or the motor vehicle floor. In the case of the drive shaft with at least two segments and at least one shaft bearing, the bending frequencies of the shaft segments are significantly higher, due to the reduced length, and are non-critical.

However, the oscillating system has a buckling eigenmode corresponding to the inertias and the dynamic stiffness of the shaft bearing, which is passed through at low speed. The frequency of the oscillating system is set by means of the stiffness of the shaft bearing, and the resonance rise is set by the material damping of the elastomer used.

The frequency range for the buckling eigenmode is usually in the range between about 20 Hz and about 30 Hz. Because the inertia of the shaft is predetermined by the torque transmission, the frequency of the buckling eigenform is largely set through the dynamic stiffness of the shaft bearing.

This results in a minimum requirement with respect to the stiffness of the shaft bearing, which has to be satisfied within a limited radial construction space. In modern drivetrains, high demands are also made with respect to axial compensation of up to ±20 mm. The great radial stiffness has to be maintained during the entire axial compensation and must not drop significantly.

SUMMARY

The present invention is based on the object of providing a shaft bearing that has an improved stiffness.

A shaft bearing is proposed in order to achieve this object. Advantageous embodiments of the shaft bearing are disclosed.

A shaft bearing for supporting a shaft, particularly a drive shaft, of a motor vehicle comprises an inner sleeve, an outer body surrounding the inner sleeve while forming a gap, and an elastomer body, which elastically connects the inner sleeve and the outer body, wherein the inner sleeve has a first rolling surface which faces towards the elastomer body and against which a first rolling section of the elastomer body abuts, wherein the outer body has a second rolling surface which faces towards the elastomer body and against which a second rolling section of the elastomer body abuts, wherein the two rolling sections are connected to each other via a fold which has a free length, and wherein, during a relative movement of the inner sleeve relative to the outer body and/or of the outer body relative to the inner sleeve, the two rolling sections roll over the same distance on the rolling surfaces facing them, so that the free length of the fold remains unchanged.

The free length of the fold is in the present case understood to mean the length of the radial outer surface, or of the radially outer curved region, of the fold of the elastomer body, which, during a relative movement of the inner sleeve relative to the outer body and/or of the outer body relative to the inner sleeve does not abut against any counter-surface and is, thus, free. The abutting length of the elastomer body is in the present case understood to mean the length of the surface of the elastomer body facing towards the rolling surfaces and abutting the same. In the present case, the fold of the elastomer body may also be referred to as a rolling fold.

It was found that, due to the rolling surface on the outer body and the rolling surface on the inner sleeve, the stiffness, particularly the radial stiffness, of the shaft bearing can be maintained at a constantly high level, because it is always only the free curved region of the fold between the inner sleeve and the outer body that determines the stiffness, and the length thereof, immutably, remains equally short. Consequently, the abutting length of the elastomer body does not change during a relative movement of the inner sleeve and the outer body, due to the identical distance over which the two rolling sections roll. Rather, during a relative movement of the inner sleeve and the outer body, the abutting length of the elastomer body on the first rolling surface and the second rolling surface changes by the same amount, so that the free length of the fold remains unchanged. Thus, the inner and outer guidance of the elastomer body advantageously ensures a constant stiffness, particularly radial stiffness, of the shaft bearing during a relative movement of the inner sleeve and the outer body, particularly during an axial deflection of the inner sleeve and the outer body. In the present case, an axial deflection is understood to mean a deflection of the inner sleeve and/or the outer body in the longitudinal direction of the shaft bearing.

Apart from the great radial stiffness, the free, short length of the fold, which always remains unchanged, also provides for a high frequency of the radial flexible eigenmode with a stiffness peak. From a frequency of about 400 Hz to about 600 Hz, this eigenmode is no longer relevant due to the lack of excitation. Because of the two rolling surfaces, the rolling sections are able to permanently abut against the inner sleeve and the outer body, whereby the rolling fold is forced to execute a clean rolling movement. The fold is thus prevented from buckling, so that high loads are avoided locally.

In addition, because the two rolling sections permanently abut against the rolling surfaces, the maintenance of the smallest admissible bending radius of the fold is guaranteed, so that the fold is not damaged in case of a permanent load.

Advantageously, the elastomer body of the shaft bearing has a first leg and a second leg, which are elastically connected to each other via the fold. Preferably, the first leg abuts against the inner sleeve, and the second leg abuts against the outer body. In an advantageous embodiment, the first leg includes the first rolling surface and the second leg includes the second rolling surface. Advantageously, after the vulcanization of the elastomer body, the second leg protrudes at an angle from the first leg, so that the elastomer body, when inserted, in particular pressed, into an accommodating opening of the outer body, abuts against the outer body with a bias, and thus permanently against the second rolling surface. After the insertion of the elastomer body, the two legs are advantageously orientated parallel to each other.

The outer body may be configured as a sleeve or a ring. If the outer body is a sleeve or ring, the outer body is inserted, in particularly pressed, into a bearing support. The shaft bearing is fastened via the bearing support to a motor vehicle component, such as a motor vehicle body or a motor vehicle floor, for example. Furthermore, the outer body may be a bearing support. The outer body may consist of metal or plastic, particularly a fiber-reinforced plastic.

The inner sleeve forms the first rolling surface for the elastomer body, in particular the first rolling section. The inner sleeve itself may form the first rolling surface by the inner sleeve being formed, particularly elongated in the longitudinal direction, and calibrated accordingly. Moreover, the inner sleeve may include a further element that forms the first rolling surface and is connected to the inner sleeve. The inner sleeve may consist of metal or plastic, particularly a fiber-reinforced plastic.

Further, the shaft bearing may include a roller bearing pressed into an accommodating opening formed by the inner sleeve. The roller bearing envelops the shaft to be supported.

In an advantageous embodiment, the ratio of the abutting length of the elastomer body to the free length of the fold is about 2/1. Thus, the free length of the fold that determines the stiffness, in particular the radial stiffness, is formed to be short so that the shaft bearing has a high radial stiffness. At the same time, due to the short, free length of the fold, the latter's radial flexible eigenmode with a stiffness peak shifts towards high frequencies that are no longer relevant due to a lack of excitation.

In an advantageous embodiment, the inner sleeve has an appendage forming the first rolling surface. The appendage advantageously forms an extension of the inner sleeve in the longitudinal direction of the shaft bearing, so that the elastomer body, particularly the first leg, is able to permanently abut against and roll on the appendage. Thus, the fold is forced to execute a clean rolling movement. The appendage may be integrally connected to the inner sleeve or be configured as a separate element connected to the inner sleeve. Further, the appendage may have a single-part or multi-part configuration. Advantageously, the inner sleeve has a shoulder with which the appendage is connected. If the inner sleeve is incorporated into the elastomer body by vulcanization, the appendage advantageously protrudes from the elastomer body, so that the appendage can be connected to the shoulder. Advantageously, the diameter of the shoulder is smaller than the diameter of the inner sleeve forming the accommodating opening for accommodating a roller bearing. Furthermore, the appendage, particularly its outer circumferential surface, may be provided with a contour in order to optimally set the constantly high radial stiffness. The appendage may be made from metal or plastic, particularly a fiber-reinforced plastic. In order to absorb the forces acting on the appendage when the elastomer body rolls, the appendage may be configured to be thicker compared with the inner sleeve. Preferably, a free end of the appendage is bent, in particularly bent radially inwards. Thus, the elastomer body is not damaged during the rolling movement.

In an advantageous embodiment, the appendage is a ring member. A ring member is simple and inexpensive to produce. Moreover, the length of the rolling surface for the first rolling section can be simply and inexpensively set over the width and/or contour of the ring member.

In an advantageous embodiment, the appendage is connected positively, non-positively and/or by substance-to-substance connection to the inner sleeve. Thus, the appendage may be pressed onto the inner sleeve. In particular, the appendage is pressed onto a shoulder of the inner sleeve. Moreover, the appendage can be soldered, welded and/or glued to the inner sleeve.

In an advantageous embodiment, the first rolling surface and/or the second rolling surface are contoured. By means of a contouring of the first rolling surface and/or of the second rolling surface, a constantly high radial stiffness can be set, so that the acoustics in the vehicle remain optimally set even in the event of extreme deflections of the inner sleeve and the outer body. The contouring may be configured as a recess or depression incorporated into the inner sleeve and/or outer body.

In an advantageous embodiment, the inner sleeve and/or the outer body have a single-part or multi-part configuration. Advantageously, the several parts of the inner sleeve and/or of the outer body are connected to one another positively, non-positively and/or by substance-to-substance connection. Preferably, the several parts are press-connected.

In an advantageous embodiment, the inner sleeve and/or the outer body are connected to the elastomer body positively, non-positively or by substance-to-substance connection. For example, the inner sleeve may be integrated into the elastomer body by vulcanization. Advantageously, the elastomer body is pressed into an accommodating opening of the outer body. Moreover, the outer body may be integrated into the elastomer body by vulcanization.

In an advantageous embodiment, the elastomer body has a fastening portion for fastening the elastomer body to the outer body. The fastening portion may have a peripheral depression, which is incorporated into the elastomer body and into which a protrusion protruding from the outer body extends. Moreover, the fastening portion may have a collar portion abutting against an end face of the outer body.

In an advantageous embodiment, the fastening portion is fixed on the outer body by means of a securing ring. The securing ring serves for securing the elastomer body and prevents the elastomer body from being pulled out of the accommodating opening of the outer body. Also advantageously, the securing ring may have a first fastening leg and a second fastening leg that include an angle between them. Advantageously, the first fastening leg abuts against the collar portion, and the second fastening leg abuts against the elastomer body in the region of the depression. Moreover, the second fastening leg has a bent end portion configured for reaching behind the protrusion protruding from the outer body. The securing ring may be configured as a snap ring. Advantageously, the securing ring is pressed onto the fastening portion in order to fix the elastomer body on the outer body.

BRIEF DESCRIPTION OF THE DRAWINGS

A shaft bearing and further features and advantages are explained below with reference to an exemplary embodiment, which is schematically depicted in the Figures. In the Figures.

DETAILED DESCRIPTION

Figure 2:
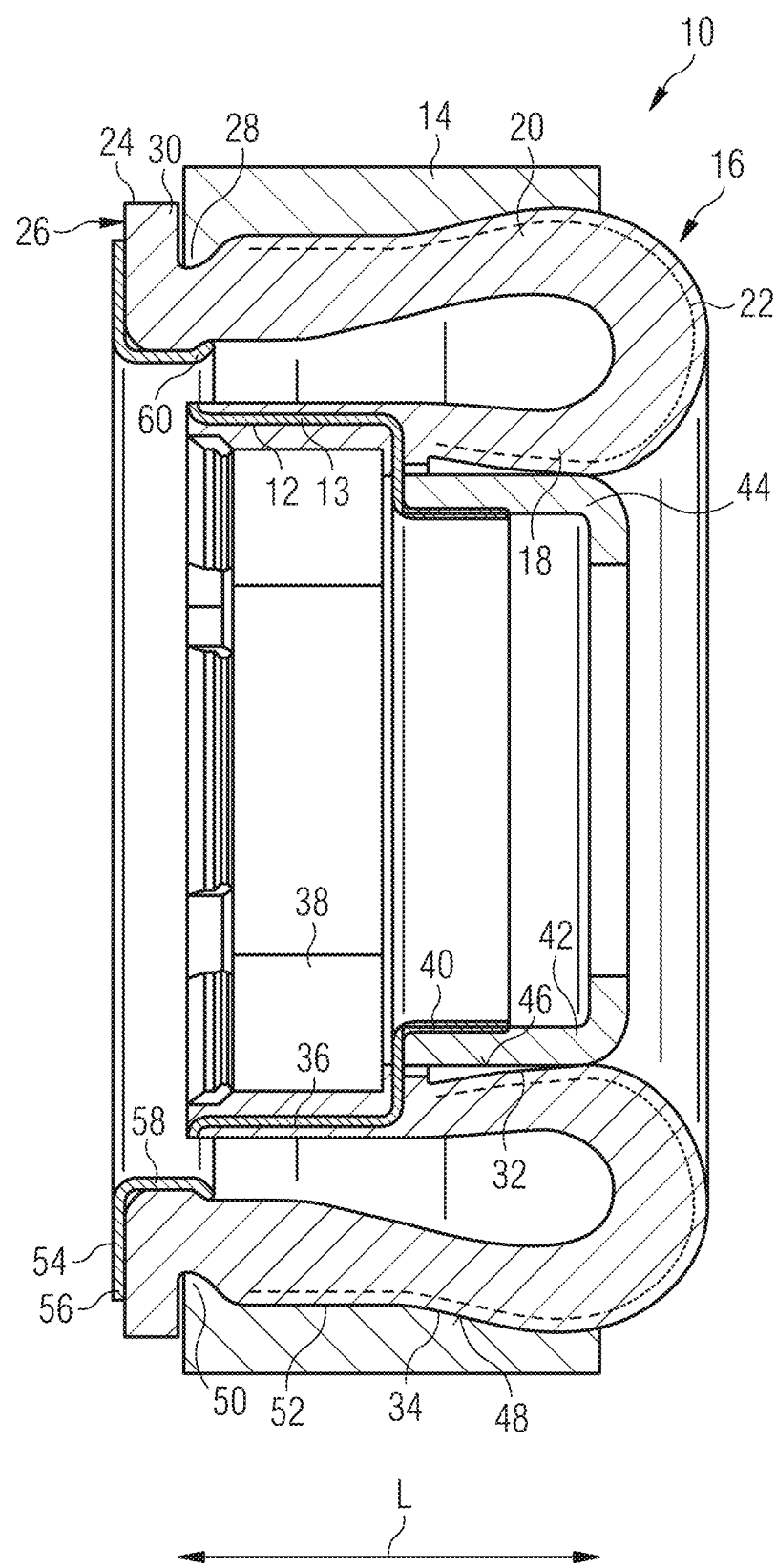
FIG. 2 shows a cross section through a shaft bearing.
Figure 3:
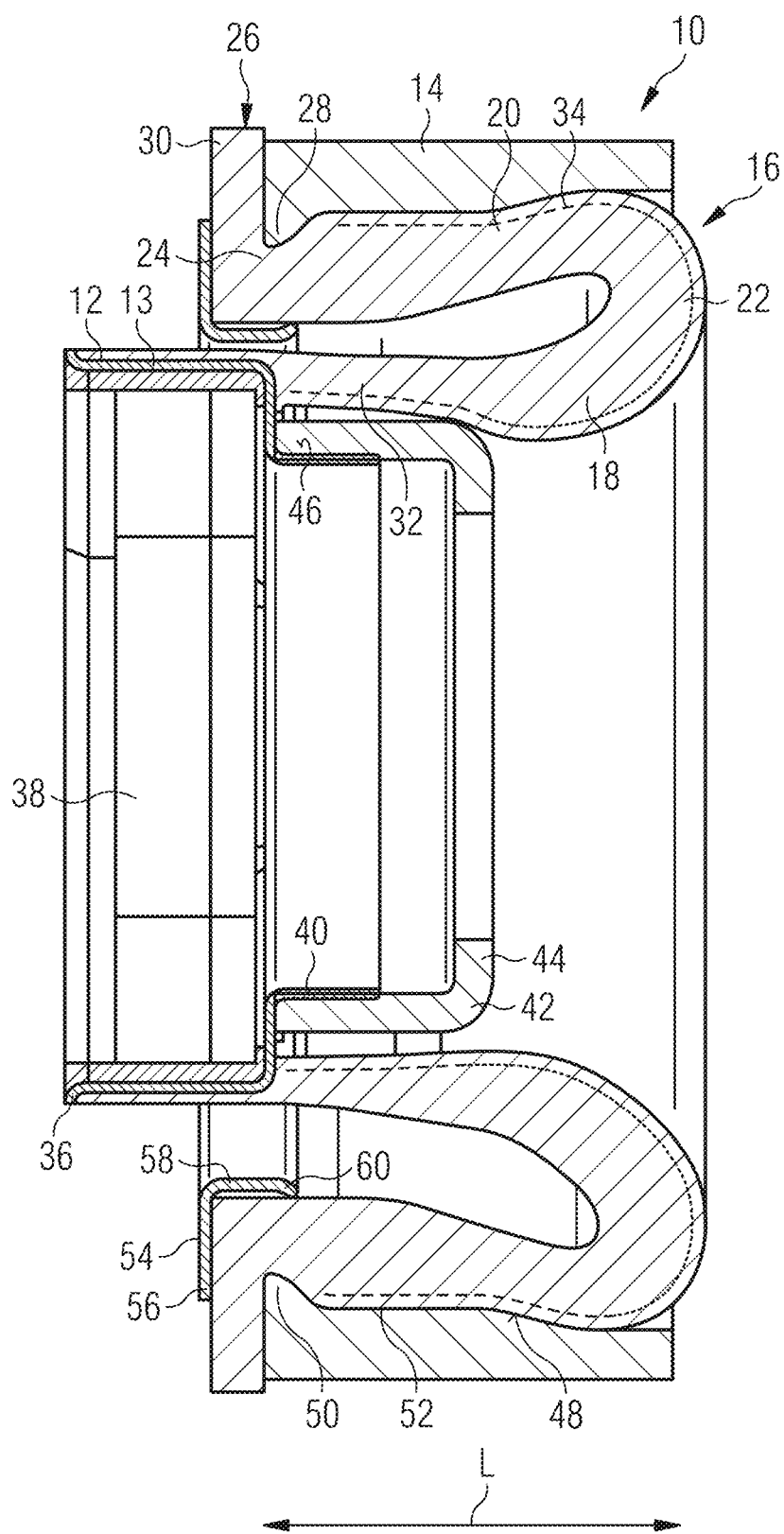
FIG. 3 shows a cross section through the shaft bearing, wherein the inner sleeve is displaced towards the upper left relative to an outer body.
Figure 4:
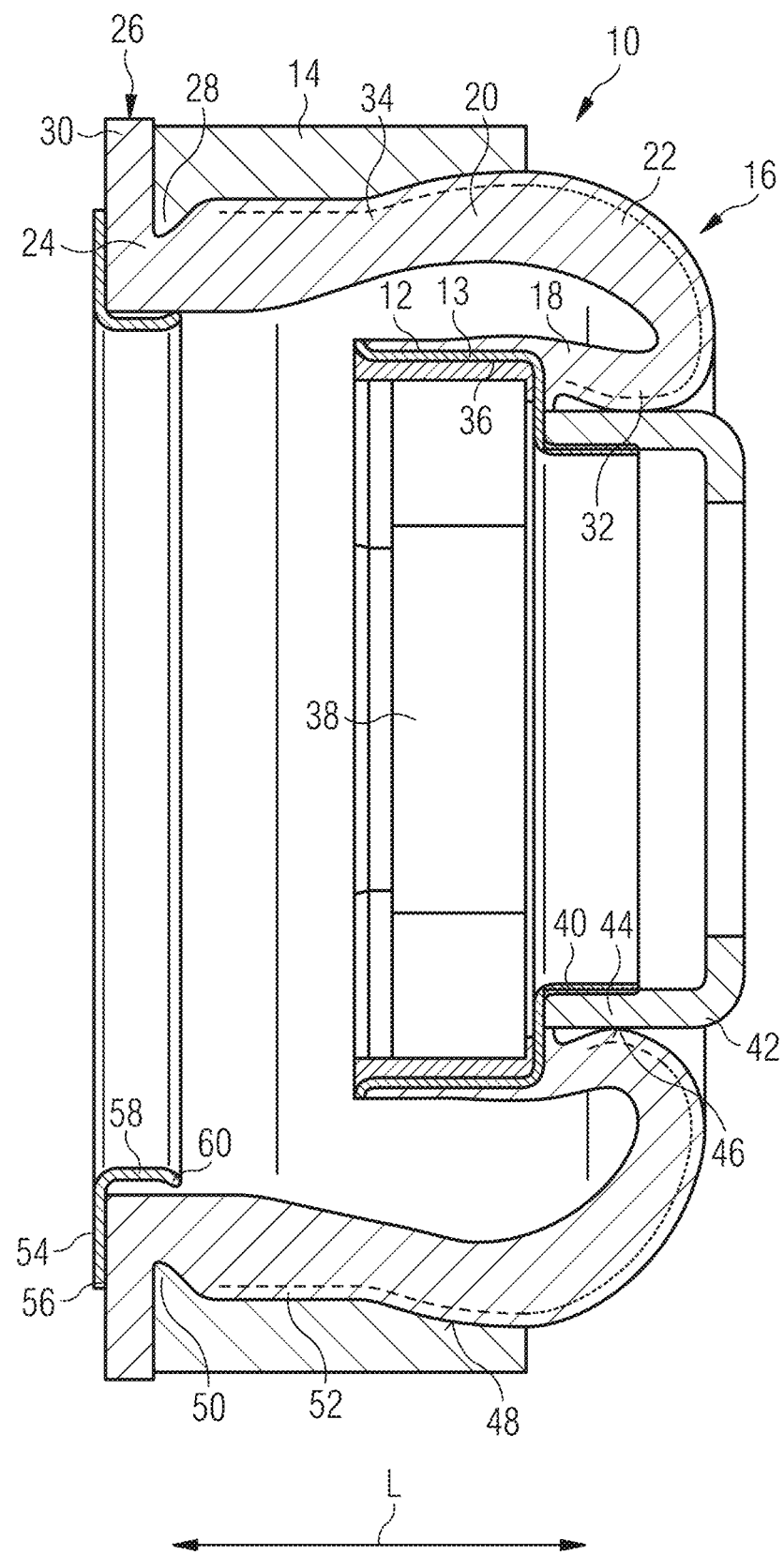
FIG. 4 shows a cross section through the shaft bearing, wherein the inner sleeve is deflected towards the upper right relative to the outer body.

FIGS. 2 to 4 show a shaft bearing 10 serving for supporting a shaft not depicted, in particular a drive shaft, such as a cardan shaft, on a motor vehicle component, which is not shown, such as a motor vehicle body or a motor vehicle floor, for example.

The shaft bearing comprises an inner sleeve 12, an outer body 14 surrounding the inner sleeve 12 while forming a gap, and an elastomer body 16, which elastically connects the inner sleeve 12 and the outer body 14.

Figure 1:
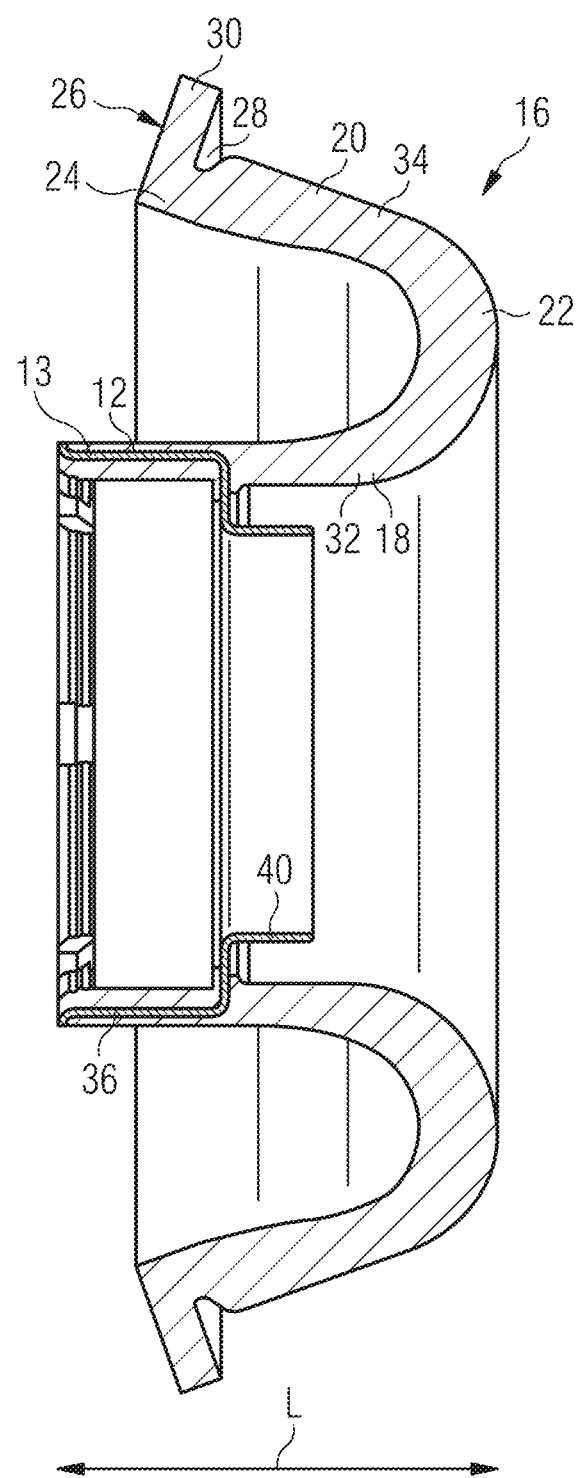
FIG. 1 shows a cross section through an elastomer body with an inner sleeve integrated by vulcanization, subsequent to the vulcanization of the former.

FIG. 1 shows the elastomer body 16 after its vulcanization. The elastomer body 16 has a first leg 18, a second leg 20 and a fold 22 connecting the two legs 18, 20 to each other. The inner sleeve 12, particularly an accommodating portion 13 of the inner sleeve 12, is incorporated in a substance-to-substance connection, by vulcanization, into the first leg 18. At a free end 24, the second leg 20 has a fastening portion 26 that includes a peripheral depression 28 and a collar portion 30. The elastomer body 16 is fastened to the outer body 14 via the fastening portion 26. Furthermore, the first leg 18 has a first rolling section 32, and the second leg 20 has a second rolling section 34, the functions of which will be described in more detail below.

The accommodating portion 13 of the inner sleeve 12 forms an accommodating opening 36 for pressing in one of the roller bearings 38 schematically shown in the FIGS. 2 to 4. The shaft bearing 10 is supported on a shaft, which is not shown, via the roller bearing 38. A shoulder 40, which has a smaller diameter than the accommodating portion 13, is adjacent to the accommodating portion 13, wherein the shoulder 40 protrudes from the elastomer body 16.

An appendage 42, which is configured as a ring member 44, is fixed to the shoulder 40, wherein the appendage 42 is pressed onto the shoulder 40. The appendage 42 has a first rolling surface 46 facing towards the first rolling section 32, as is shown in the FIGS. 2 to 4. At its free end, the appendage 42 is bent radially inwards. The inner sleeve 12 and the appendage 42 may be made from metal or plastic, particularly a fiber-reinforced plastic. As is also apparent from the FIGS. 2 to 4, the appendage 42 in the present case is thicker than the inner sleeve 12. The appendage may also have the same thickness as the inner sleeve 12. Furthermore, the inner sleeve 12 itself may form the first rolling surface 46 by the inner sleeve 12 being elongated in the longitudinal direction L of the shaft bearing 10, in particular the shoulder 40.

In the present case, the outer body 14 is a sleeve or ring member and made from metal or plastic, particularly a fiber-reinforced plastic. The outer body 14 is inserted, in particular pressed, into a bearing support which is not shown, in order to attach the shaft bearing 10 to a motor vehicle component, which is not shown, such as a motor vehicle body or a motor vehicle floor, for example.

The outer body 14 has a second rolling surface 48 facing towards the second rolling section 34. The second rolling surface 48 is formed in a contoured manner, whereby the elastomer body 16, particularly the second rolling section 34, permanently abuts against the outer body 14. Furthermore, the outer body 14 has a radially inwardly protruding protrusion 50 that is able to extend into the peripheral depression 28.

In order to fasten the elastomer body 16 to the outer body 14, the second leg 20 is first compressed, and the elastomer body 16 is inserted into the opening 52 of the outer body 14 in such a way that the protrusion 50 extends into the peripheral depression 28 and the collar portion 30 abuts against an end face of the outer body 14.

In order to secure the elastomer body 16 against the elastomer body 16 being pulled out of the opening 52 of the outer body 14, a securing ring 54 is pressed onto the fastening portion 26. The securing ring 54 has a first fastening leg 56 and a second fastening leg 58 that include an angle between them. The first fastening leg 56 abuts against the collar portion 30, and the second fastening leg 58 abuts against the elastomer body 16 in the region of the depression 28. Moreover, the second fastening leg 28 has a bent end portion 60 configured for reaching behind the protrusion 50.

The elastomer body 16, particularly the two legs 18, 20 and the associated rolling sections 32, 34, abut against the outer body 14 and the appendage 42, particularly the rolling surfaces 46, 48, in a biased manner. Due to the bias, the first rolling section 32 permanently abuts against the first rolling surface 46, and the second rolling section 34 permanently abuts against the second rolling surface 48.

As is apparent from FIG. 2, the ratio of the abutting length (shown with dashed lines in the FIGS. 2 to 4) of the rolling sections 32, 34, which corresponds to the length of the surface of the elastomer body 16 abutting against the outer body 14 and the appendage 42, to the free length of the fold 22 (shown in dotted lines in the FIGS. 2 to 4), which corresponds to the length of the free curved region of the fold 22 that abuts neither against the outer body 14 nor against the appendage 42, is about 2/1. Thus, the free length of the fold 22 is very short.

In the case of a relative movement of the inner sleeve 12 relative to the outer body 14, as it is shown in the FIGS. 3 and 4, the rolling sections 32, 34 roll on the rolling surfaces 46, 48 facing them. In particular, the two rolling sections 32, 34 roll over the same distance on the rolling surfaces 46, 48 facing them, so that the free length of the fold 22 remains unchanged. Due to the inner and outer guidance of the elastomer member 16, the fold 22 is forced to execute a clean rolling movement. This prevents the fold 22 from buckling and high loads from being produced locally. Consequently, the shaft bearing 10 is capable of maintaining a high radial stiffness at a constantly high level, because it is always only the free curved region of the fold 22 between the inner sleeve 12 and the outer body 14 that determines the stiffness, and the length thereof remains unchanged. Due to the short, free length of the fold 22, the radial flexible eigenmode with a stiffness peak shifts towards high frequencies that are no longer relevant due to a lack of excitation.

What is claimed is:

1. A shaft bearing for supporting a shaft of a motor vehicle, comprising:

an inner sleeve, an outer body surrounding the inner sleeve while forming a gap, and an elastomer body, which elastically connects the inner sleeve and the outer body, wherein the inner sleeve has a first rolling surface which faces towards the elastomer body and against which a first rolling section of the elastomer body abuts, wherein the outer body has a second rolling surface which faces towards the elastomer body and against which a second rolling section of the elastomer body abuts, wherein the first and second rolling sections are connected to each other via a fold which has a free length, and wherein, during a relative movement of the inner sleeve relative to the outer body and/or of the outer body relative to the inner sleeve, the first and second rolling sections roll over the same distance on the first and second rolling surfaces facing them, so that the free length of the fold remains unchanged.

2. The shaft bearing according to claim 1, wherein a ratio of an abutting length of the elastomer body to the free length of the fold is 2/1.

3. The shaft bearing according to claim 1, wherein the inner sleeve has an appendage forming the first rolling surface.

4. The shaft bearing according to claim 3, wherein the appendage is a ring member.

5. The shaft bearing according to claim 3, wherein the appendage is connected to the inner sleeve positively, non-positively or by substance-to-substance connection.

6. The shaft bearing according to claim 1, wherein the first rolling surface and/or the second rolling surface are contoured.

7. The shaft bearing according to claim 1, wherein the inner sleeve and/or the outer body have a single-part or multi-part configuration.

8. The shaft bearing according to claim 1, wherein the inner sleeve and/or the outer body are connected to the elastomer body positively, non-positively or by substance-to-substance connection.

9. The shaft bearing according to claim 1, wherein the elastomer body has a fastening portion for fastening the elastomer body to the outer body.

10. The shaft bearing according to claim 9, wherein the fastening portion is fixed on the outer body via a securing ring.

* * * * *